United States Patent
Mathews et al.

(10) Patent No.: US 9,998,325 B2
(45) Date of Patent: *Jun. 12, 2018

(54) APPARATUS AND METHOD FOR SEAMLESS COMMISSIONING OF WIRELESS DEVICES

(71) Applicant: GOOGLE INC., Mountain View, CA (US)

(72) Inventors: Jeffrey P. Mathews, Longmont, CO (US); Lee R. Taylor, Boulder, CO (US)

(73) Assignee: GOOGLE LLC, Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/452,654

(22) Filed: Mar. 7, 2017

(65) Prior Publication Data

US 2017/0180200 A1 Jun. 22, 2017

Related U.S. Application Data

(63) Continuation of application No. 15/159,735, filed on May 19, 2016, now Pat. No. 9,591,690, which is a (Continued)

(51) Int. Cl.
*H04L 12/24* (2006.01)
*H04B 10/116* (2013.01)
*H04W 84/12* (2009.01)

(52) U.S. Cl.
CPC ........ *H04L 41/0806* (2013.01); *H04B 10/116* (2013.01); *H04W 84/12* (2013.01)

(58) Field of Classification Search
CPC ..... H04W 4/005; H04W 4/008; H04W 84/18; H04W 84/12; H04W 76/02; H04L 41/0803; H04L 41/0806; H04B 10/116
See application file for complete search history.

(56) References Cited

U.S. PATENT DOCUMENTS

| 4,049,973 A | 9/1977 | Lambert |
| 5,838,226 A | 11/1998 | Houggy |

(Continued)

OTHER PUBLICATIONS

Detailed Technical Specification of Security for Heterogeneous Access, May 31, 2002, 161 pgs, www.isrc.rhul.ac.uk/shaman/docs/d09v1.pdf.

(Continued)

*Primary Examiner* — Paul H Masur
(74) *Attorney, Agent, or Firm* — Morgan, Lewis & Bockius LLP

(57) ABSTRACT

An electronic device includes a first processor; a first commissioning element to communicate with external devices using wireless communication and a first memory storing programs for commissioning a target device onto a wireless local area network (WLAN). The WLAN has configuration data including a WLAN identifier and a network key. The programs provide a user interface for commissioning the target device. The target device includes a second processor, a second wireless radio, and a second commissioning element to receive the WLAN configuration data. The target device decodes the WLAN configuration data to commission the target device onto the WLAN. The electronic device sends the WLAN configuration data to the target device and receives confirmation that the target device has successfully connected to the WLAN. The electronic device displays the success in a user interface.

20 Claims, 6 Drawing Sheets

Related U.S. Application Data continuation of application No. 14/927,406, filed on Oct. 29, 2015, now Pat. No. 9,485,790, which is a continuation of application No. 13/839,828, filed on Mar. 15, 2013, now Pat. No. 9,198,204.

(60) Provisional application No. 61/622,620, filed on Apr. 11, 2012.

(56) References Cited

U.S. PATENT DOCUMENTS

| | | | |
|---|---|---|---|
| 6,597,396 | B1 | 7/2003 | Quendt |
| 7,260,597 | B1 | 8/2007 | Hofrichter et al. |
| 7,352,930 | B2 | 4/2008 | Lowles |
| 7,570,485 | B2 | 8/2009 | Krah |
| 7,830,258 | B2 | 11/2010 | McAllister |
| 7,953,327 | B2 | 5/2011 | Pereira et al. |
| 7,965,983 | B1 | 6/2011 | Swan et al. |
| 8,049,434 | B2 | 11/2011 | Crouse et al. |
| 8,096,695 | B2 | 1/2012 | Ong |
| 8,156,500 | B2 | 4/2012 | Helander |
| 8,161,420 | B2 | 4/2012 | Ding |
| 8,204,979 | B2 | 6/2012 | Vutharkar et al. |
| 8,228,198 | B2 | 7/2012 | McAllister |
| 8,265,674 | B2 | 9/2012 | Choong et al. |
| 8,279,158 | B2 | 10/2012 | Lowles et al. |
| 8,295,990 | B2 | 10/2012 | Venkatakrishnan et al. |
| 8,370,370 | B2 | 2/2013 | Huang et al. |
| 8,406,819 | B2 | 3/2013 | Steer et al. |
| 8,407,347 | B2 | 3/2013 | Zhang et al. |
| 8,409,001 | B2 | 4/2013 | Chang |
| 8,471,500 | B2 | 6/2013 | Fletcher et al. |
| 8,478,450 | B2 | 7/2013 | Lu et al. |
| 8,508,465 | B2 | 8/2013 | Broga et al. |
| 8,519,844 | B2 | 8/2013 | Richey et al. |
| 8,543,688 | B1 | 9/2013 | Ramamurthy |
| 8,576,276 | B2 | 11/2013 | Bar-zeev et al. |
| 8,606,645 | B1 | 12/2013 | Applefeld |
| 8,613,070 | B1 | 12/2013 | Borzycki et al. |
| 8,688,392 | B2 | 4/2014 | Tam et al. |
| 8,823,795 | B1 | 9/2014 | Scalisi et al. |
| 8,942,694 | B2 | 1/2015 | Woo |
| 9,009,805 | B1 | 4/2015 | Kirkby et al. |
| 9,207,659 | B1 | 12/2015 | Sami |
| 9,325,516 | B2 | 4/2016 | Pera et al. |
| 9,326,126 | B2 | 4/2016 | Yang |
| 9,401,901 | B2 | 7/2016 | Huang et al. |
| 9,412,266 | B2 | 8/2016 | Chen et al. |
| 9,419,871 | B2 | 8/2016 | Foley et al. |
| 9,462,624 | B2 | 10/2016 | Logue |
| 9,479,504 | B2 | 10/2016 | Bae et al. |
| 9,488,994 | B2 | 11/2016 | Zywicki et al. |
| 9,528,861 | B1 | 12/2016 | Haupt et al. |
| 9,547,980 | B2 | 1/2017 | Chen et al. |
| 9,554,061 | B1 | 1/2017 | Proctor, Jr. |
| 2002/0016639 | A1 | 2/2002 | Smith et al. |
| 2003/0061284 | A1 | 3/2003 | Mandarino et al. |
| 2003/0169728 | A1 | 9/2003 | Choi |
| 2004/0083393 | A1 | 4/2004 | Jordan et al. |
| 2004/0243257 | A1 | 12/2004 | Theimer |
| 2005/0041686 | A1 | 2/2005 | Roy et al. |
| 2005/0281277 | A1 | 12/2005 | Killian |
| 2006/0109988 | A1 | 5/2006 | Metcalf |
| 2006/0174102 | A1 | 8/2006 | Smith et al. |
| 2006/0259183 | A1 | 11/2006 | Hayes et al. |
| 2007/0014303 | A1 | 1/2007 | Schulz et al. |
| 2007/0250592 | A1 | 10/2007 | Reckamp et al. |
| 2007/0294335 | A1 | 12/2007 | Gershom |
| 2008/0037444 | A1 | 2/2008 | Chhabra |
| 2008/0089300 | A1 | 4/2008 | Yee |
| 2008/0122606 | A1 | 5/2008 | Bradley |
| 2008/0219672 | A1 | 9/2008 | Tam et al. |
| 2008/0277486 | A1 | 11/2008 | Seem et al. |
| 2009/0070681 | A1 | 3/2009 | Dawes et al. |
| 2009/0080896 | A1 | 3/2009 | Pereira et al. |
| 2009/0244097 | A1 | 10/2009 | Estevez |
| 2010/0068997 | A1 | 3/2010 | Dunko |
| 2010/0130166 | A1 | 5/2010 | Tsuria et al. |
| 2010/0138007 | A1 | 6/2010 | Clark et al. |
| 2010/0141153 | A1 | 6/2010 | Recker et al. |
| 2010/0192212 | A1 | 7/2010 | Raleigh |
| 2010/0246825 | A1 | 9/2010 | Baras et al. |
| 2010/0248707 | A1 | 9/2010 | Hoffner et al. |
| 2010/0283579 | A1 | 11/2010 | Kraus et al. |
| 2010/0283584 | A1 | 11/2010 | McAllister |
| 2011/0107364 | A1 | 5/2011 | Lajoie et al. |
| 2011/0121654 | A1 | 5/2011 | Recker et al. |
| 2011/0172844 | A1 | 7/2011 | Choong et al. |
| 2011/0199004 | A1 | 8/2011 | Henig et al. |
| 2011/0202151 | A1 | 8/2011 | Covaro et al. |
| 2011/0225373 | A1 | 9/2011 | Ito et al. |
| 2012/0011567 | A1 | 1/2012 | Cronk et al. |
| 2012/0049765 | A1 | 3/2012 | Lu et al. |
| 2012/0082062 | A1 | 4/2012 | McCormack |
| 2012/0144469 | A1 | 6/2012 | Ainslie et al. |
| 2012/0167063 | A1 | 6/2012 | Detwiler et al. |
| 2012/0216296 | A1 | 8/2012 | Kidron |
| 2012/0239936 | A1 | 9/2012 | Holtmanns et al. |
| 2013/0026947 | A1 | 1/2013 | Economy et al. |
| 2013/0041516 | A1 | 2/2013 | Rockenfeller et al. |
| 2013/0064132 | A1 | 3/2013 | Low et al. |
| 2013/0076491 | A1 | 3/2013 | Brandsma et al. |
| 2013/0086665 | A1 | 4/2013 | Filippi et al. |
| 2013/0124855 | A1 | 5/2013 | Varadarajan et al. |
| 2013/0198786 | A1 | 8/2013 | Cook et al. |
| 2013/0227656 | A1 | 8/2013 | Holtmanns et al. |
| 2013/0236183 | A1 | 9/2013 | Chao et al. |
| 2013/0268357 | A1 | 10/2013 | Heath |
| 2013/0276140 | A1 | 10/2013 | Coffing et al. |
| 2013/0340050 | A1 | 12/2013 | Harrison |
| 2014/0007222 | A1 | 1/2014 | Qureshi et al. |
| 2014/0068705 | A1 | 3/2014 | Chambers et al. |
| 2014/0068789 | A1 | 3/2014 | Watts et al. |
| 2014/0099933 | A1 | 4/2014 | Yerrabommanahalli et al. |
| 2014/0129006 | A1 | 5/2014 | Chen et al. |
| 2014/0137188 | A1 | 5/2014 | Bartholomay et al. |
| 2014/0157370 | A1 | 6/2014 | Plattner et al. |
| 2014/0164758 | A1 | 6/2014 | Ramamurthy |
| 2014/0164776 | A1 | 6/2014 | Hook et al. |
| 2014/0173692 | A1 | 6/2014 | Srinivasan et al. |
| 2014/0189359 | A1 | 7/2014 | Marien et al. |
| 2014/0189808 | A1 | 7/2014 | Mahaffey et al. |
| 2014/0245411 | A1 | 8/2014 | Meng et al. |
| 2014/0245461 | A1 | 8/2014 | O'Neill et al. |
| 2014/0248852 | A1 | 9/2014 | Raleigh et al. |
| 2014/0266600 | A1 | 9/2014 | Alberth, Jr. et al. |
| 2014/0273963 | A1 | 9/2014 | Su et al. |
| 2014/0281497 | A1 | 9/2014 | Medvinsky et al. |
| 2014/0282570 | A1 | 9/2014 | Prasanna |
| 2014/0282877 | A1 | 9/2014 | Mahaffey et al. |
| 2014/0310509 | A1 | 10/2014 | Potlapally et al. |
| 2014/0310510 | A1 | 10/2014 | Potlapally et al. |
| 2015/0015369 | A1 | 1/2015 | Lamb |
| 2015/0071052 | A1 | 3/2015 | Hershberg et al. |
| 2015/0126153 | A1 | 5/2015 | Spitz et al. |
| 2015/0177292 | A1 | 6/2015 | Silveira Filho et al. |
| 2015/0215297 | A1 | 7/2015 | Rathod et al. |
| 2015/0282216 | A1 | 10/2015 | Reshef et al. |
| 2016/0044032 | A1 | 2/2016 | Kim et al. |
| 2016/0089457 | A1 | 3/2016 | Liao |
| 2016/0132031 | A1 | 5/2016 | Kozura et al. |
| 2016/0380945 | A1 | 12/2016 | Wood et al. |
| 2016/0381500 | A1 | 12/2016 | Larson |

OTHER PUBLICATIONS

Google Inc., International Search Report and Written Opinion, PCT/US2015/053291, dated Feb. 5, 2016, 18 pgs.

Google Inc., International Search Report and Written Opinion, PCT/US2015/060405, dated Feb. 25, 2016, 9 pgs.

Goadrich, Mark H., and Michael P. Rogers. "Smart smartphone development: iOS versus Android." In Proceedings of the 42nd

(56) References Cited

OTHER PUBLICATIONS

ACM technical symposium on Computer science education, pp. 607-612. ACM, 2011.

Manashty, Ali Reza, Amir Rajabzadeh, and Zahra Forootan Jahromi. "A Scenario-Based Mobile Application for Robot-Assisted Smart Digital Homes." arXiv preprint arXiv:1009.5398 (2010).

Armac, Ibrahim, and Daniel Retkowitz. "Simulation of smart environments." In IEEE International Conference on Pervasive Services, pp. 257-266. IEEE, 2007.

Ramlee, Ridza Azri, Man Hong Leong, Ranjit Singh A. Sarban Singh, Mohd Muzafar Ismail, Mohd Azlishah Othman, Hamzah Asyrani Sulaiman, Mohamad Harris Misran, Meor Said, and Maizatul Alice. "Bluetooth remote home automation system using android application." (2013): 1-5.

Van Nguyen, Tam, Jin Gook Kim, and Deokjai Choi. "ISS: the interactive smart home simulator." In Advanced Communication Technology, 2009. ICACT 2009. 11th International Conference on, vol. 3, pp. 1828-1833. IEEE, 2009.

Rajabzadeh, Amir, Ali Reza Manashty, and Zahra Forootan Jahromi. "A Mobile Application for Smart House Remote Control System." arXiv preprint arXiv:1009.5557 (2010).

Gavalas, Damianos, and Daphne Economou. "Development platforms for mobile applications: Status and trends." IEEE software 28, No. 1 (2011): 77-86.

Y. Zatout, "Using wireless technologies for healthcare monitoring at home: A survey," 2012 IEEE 14th International Conference on e-Health Networking, Applications and Services (Healthcom), Beijing, 2012, pp. 383-386, URL: http://ieeexplore.ieee.org/stamp/stamp.jsp?tp=&arnumber=6379443&isnumber=6379371.

"INSTEON Compared" www.insteon.com/pdf/insteoncompared.pdf version.2 2013.

"Thread Group Information Event" https://www.threadgroup.org/Portals/0/documents/events/ThreadIntro.pdf; Sep. 30, 2014.

PRESENT DAY DEVICE COMMISSIONING MECHANISMS

*EXEMPLARY COMMISSIONING DEVICE*

*EXEMPLARY COMMISSIONED DEVICE*

EXEMPLARY COMMISSIONED DEVICE

APPARATUS AND METHOD FOR SEAMLESS COMMISSIONING OF WIRELESS DEVICES

CROSS-REFERENCE TO RELATED APPLICATIONS

This application claims priority to and is a continuation of U.S. Utility patent application Ser. No. 15/159,735, filed May 19, 2016, issued as U.S. Pat. No. 9,591,690 on Mar. 7, 2017, titled "Apparatus and Method for Seamless Commissioning of Wireless Devices," which claims priority to and is a continuation of U.S. Utility patent application Ser. No. 14/927,406, filed Oct. 29, 2015, issued as U.S. Pat. No. 9,485,790 on Nov. 1, 2016, titled "Apparatus and Method for Seamless Commissioning of Wireless Devices," which claims priority to and is a continuation of U.S. Utility patent application Ser. No. 13/839,828, filed Mar. 15, 2013, issued as U.S. Pat. No. 9,198,204 on Nov. 24, 2015, titled "Apparatus and Method for Seamless Commissioning of Wireless Devices," which claims priority to and the benefit of U.S. Provisional Application No. 61/622,620, filed on Apr. 11, 2012, titled "Apparatus and Method for Seamless Commissioning of Wireless Devices." The content of each of the above applications is herein incorporated by reference in its entirety.

TECHNICAL FIELD

This invention relates in general to the field of electronic device commissioning, and more particularly to an apparatus and method for seamless commissioning of electronic devices onto wireless local area networks (WLANs).

BACKGROUND

It is almost incredible to realize the number of electronic devices that exist today, and even more so when one considers the exponentially increasing number of those devices that are configured for wireless network integration. On the business front, laptop computers, smart phones, and tablet computers abound. On the personal front, home automation is crossing thresholds which have heretofore been untouched. Today's average consumer has access to the Internet via a high speed connection and most probably has a wireless network in their home. Attached to that wireless network are home computers, digital readers, wireless printers, and some form of wireless entertainment equipment, such as streaming media players and the like.

On top of this, everyday appliances such as door locks, thermostats, garage door openers, outlets, and light switches are now being configured for wireless operation. Both businesses and homes frequently are equipped with alarm systems that function wirelessly. The list continues to grow.

But as one skilled in the art will appreciate, wireless electronic devices do not merely connect themselves to the nearest wireless network. Rather, they must be "commissioned" onto a desired network. That is, the particular devices must be provided with configuration data to enable them to join the desired wireless network so that they can function according to specification by utilizing the communication properties of the network.

Yet, at this point in time, virtually every electronic device is different in the manner in which they are commissioned onto a wireless network. Some devices require a sequence of switch actuations that are coordinated with similar actuations on a controller device. Other devices have rudimentary keypads whereby a user enters the configuration information, often in cryptic and unintelligible form. Still other devices have keypads and displays that allow for data entry that is somewhat more user friendly. Yet more devices utilize other coupled devices (e.g., televisions and special remote controls) to enter network names and passwords. And as a result, the average user of these wireless devices must either be very smart, or they require assistance from someone who is knowledgeable.

Accordingly, what is needed is a technique for commissioning a wireless device onto a wireless network that the average consumer can employ without undue distress.

In addition, what is needed is a mechanism for commissioning wireless devices that utilizes common, user friendly steps and equipment.

SUMMARY

The present invention, among other applications, is directed to solving the above-noted problems and addresses other problems, disadvantages, and limitations of the prior art. The present invention provides a superior technique for commissioning one or more electronic devices onto an existing wireless local area network. In one embodiment an apparatus is provided for commissioning a target device onto a wireless local area network (WLAN). The apparatus includes a smart wireless device. The smart wireless device has commissioning logic and a transducer. The commissioning logic is configured to format and direct transmission of one or more WLAN configuration packets that convey WLAN configuration data. The transducer is coupled to the commissioning logic, and is configured to transmit the one or more WLAN configuration packets over the transmission path to the target device, wherein the transducer is an existing component of the smart wireless device.

One aspect of the present invention contemplates an apparatus for wireless local area network (WLAN) device commissioning. The apparatus has a smart wireless device and a target device. The smart wireless device includes first commissioning logic and a first transducer. The first commissioning logic is configured to format and direct transmission of one or more WLAN configuration packets. The first transducer is coupled to the first commissioning logic, and is configured to transmit the one or more WLAN configuration packets over the transmission path, where the first transducer is an existing component of the smart wireless device. The target device includes a second transducer, second commissioning logic, and a wireless radio. The second transducer is configured to receive the one or more WLAN configuration packets. The second commissioning logic is coupled to the second transducer, and is configured to decode and process the one or more WLAN configuration packets to recover WLAN configuration data. The wireless radio is operatively coupled to the commissioning logic, and is configured to employ the WLAN configuration data to enable the target device to join a WLAN.

Another aspect of the present invention comprehends a method for wireless local area network (WLAN) device commissioning. The method includes: executing a first application on a smart wireless device to format and direct transmission of one or more WLAN packets; via a first transducer of the smart wireless device, transmitting the one or more WLAN configuration packets over a transmission path, where the first transducer is an existing component of the smart wireless device; via a second transducer disposed within a target device, receiving the one or more WLAN configuration packets; executing a second application on the target device to decode and process the one or more WLAN configuration packets to recover WLAN configuration data; and via a wireless radio disposed within the target device, employing the WLAN configuration data to enable the target device to join a WLAN.

BRIEF DESCRIPTION OF THE DRAWINGS

These and other objects, features, and advantages of the present invention will become better understood with regard to the following description, and accompanying drawings where.

DETAILED DESCRIPTION

Figure 1:
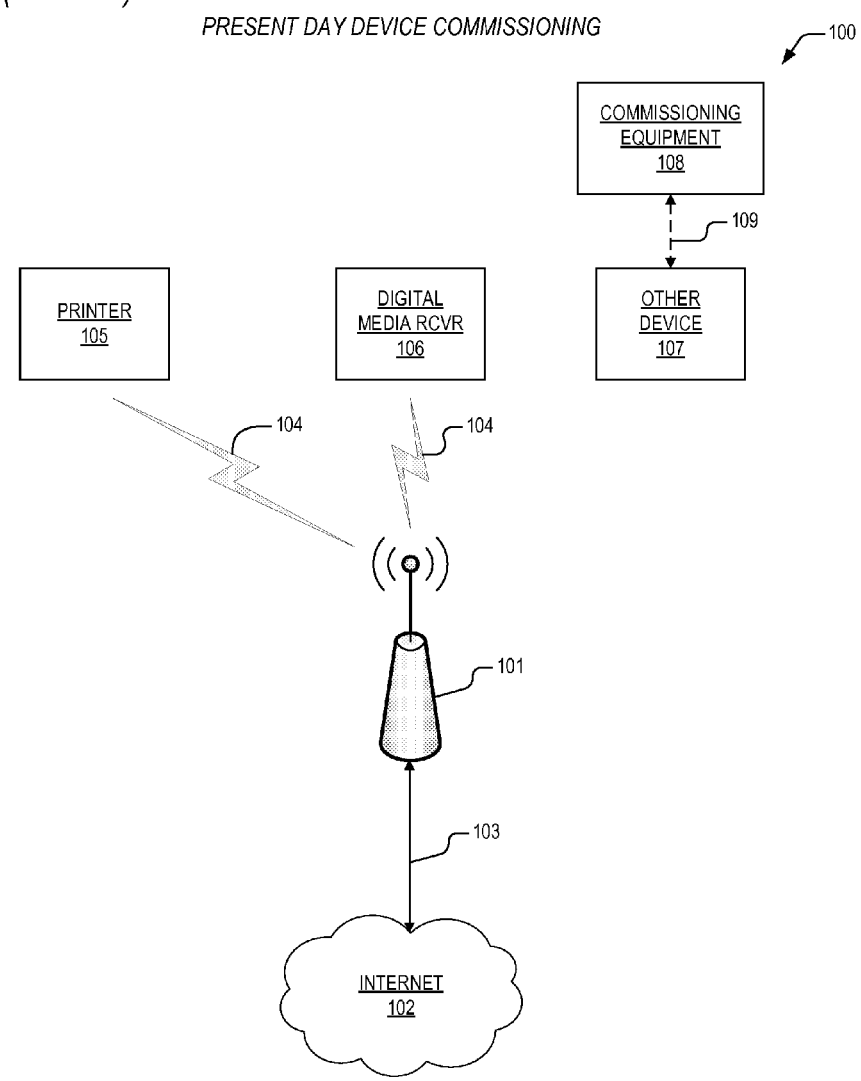
FIG. 1 is a block diagram illustrating a present day device commissioning technique.

Exemplary and illustrative embodiments of the invention are described below. In the interest of clarity, not all features of an actual implementation are described in this specification, for those skilled in the art will appreciate that in the development of any such actual embodiment, numerous implementation specific decisions are made to achieve specific goals, such as compliance with system-related and business related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition will be expressly set forth in the specification in a definitional manner that directly and unequivocally provides the special definition for the term or phrase.

In view of the above background discussion on device commissioning and associated techniques employed within present day systems for commissioning a wireless device into a wireless network, a discussion of the limitations of these present day mechanisms will now be discussed with reference to FIGS. 1-2. Following this, a discussion of the present invention will be presented with reference to FIGS. 3-8. The present invention overcomes limitations of present day device commissioning techniques by providing apparatus and methods that enable devices to be commissioned into a wireless network without requiring special purpose commissioning hardware, administrative access to network equipment, the creation of ad hoc networks, or compromises to operational security.

Turning to FIG. 1, a block diagram 100 is presented illustrating a present day device commissioning technique. The diagram 100 depicts a wireless local area network (WLAN) access point 101 that controls access to and communications over a WLAN 104. As one skilled in the art will appreciate, the access point 101 may also be referred to as a Wi-Fi access point 101, a Wi-Fi router 101, a Wi-Fi gateway 101, a Wi-Fi hub 101, and the like which refer to a controller 101 that allows electronic devices 105-107 to exchange data wirelessly over a wireless network 104. Often, the network 104 utilizes protocols based on the Institute of Electrical and Electronics Engineers' (IEEE) 802.11 standards, however, such references are not intended to limit protocols of the network 104 to 802.11, but rather reference is made to the well known 802.11 standards in order to teach aspects of the present invention.

The WLAN access point 101 is coupled via bus 103 to the Internet in any of number of well known ways to include digital subscriber line (DSL), cable, and wireless radio link. As such, the access point 101 enables the devices 105-107 to communicate with each other, and also to other devices (not shown) over the Internet 102.

The diagram 100 shows a printer 105 and a digital media receiver 106 (e.g., APPLETV®, ROKU®, DIRECTV®) that are coupled to the access point 101 via the WLAN 104. The diagram additionally shows an other device 107 that is not yet coupled to the access point 101 via the WLAN 104, and which requires commissioning into the WLAN 104. As one skilled in the art will appreciate, the other device 107 may comprise, but is not limited to a personal computer, a video game console, a smartphone, a tablet computer, an alarm console, a streaming media player, network attached storage, and any number of other Wi-Fi enabled appliances (e.g., outlets, lights, locks, sensors, etc.). Although reference is made to "Wi-Fi enabled appliances," the present inventors noted that applications of the present invention extend beyond commonly construed "Wi-Fi" protocols (i.e., IEEE 802.11 protocols) to comprehend any wireless protocol, as will be discussed in further detail below. For purposes of the present disclosure, "commissioning" is construed to mean configuration of the other device 107 and the system 100 as a whole such that the other device 107 is enabled to function properly over the WLAN 104 including, if required, access to the Internet 102.

As one skilled in the art will appreciate, there are a number of varying techniques that may be employed to commission present day devices onto a WLAN 104. Some of these techniques require operator intervention, some require the use of special purpose commissioning equipment 108, and some require the creation of temporary (or ad hoc) wireless networks 109. And the present inventors have noted that as wireless device usage proliferates in the office and the home, this cornucopia of commissioning techniques poses challenges to those in the art, because each individual technique is limited with regard to one system attribute or another. A more detailed discussion of the limitations associated with present day commissioning techniques will now be presented with reference to FIG. 2.

Figure 2:
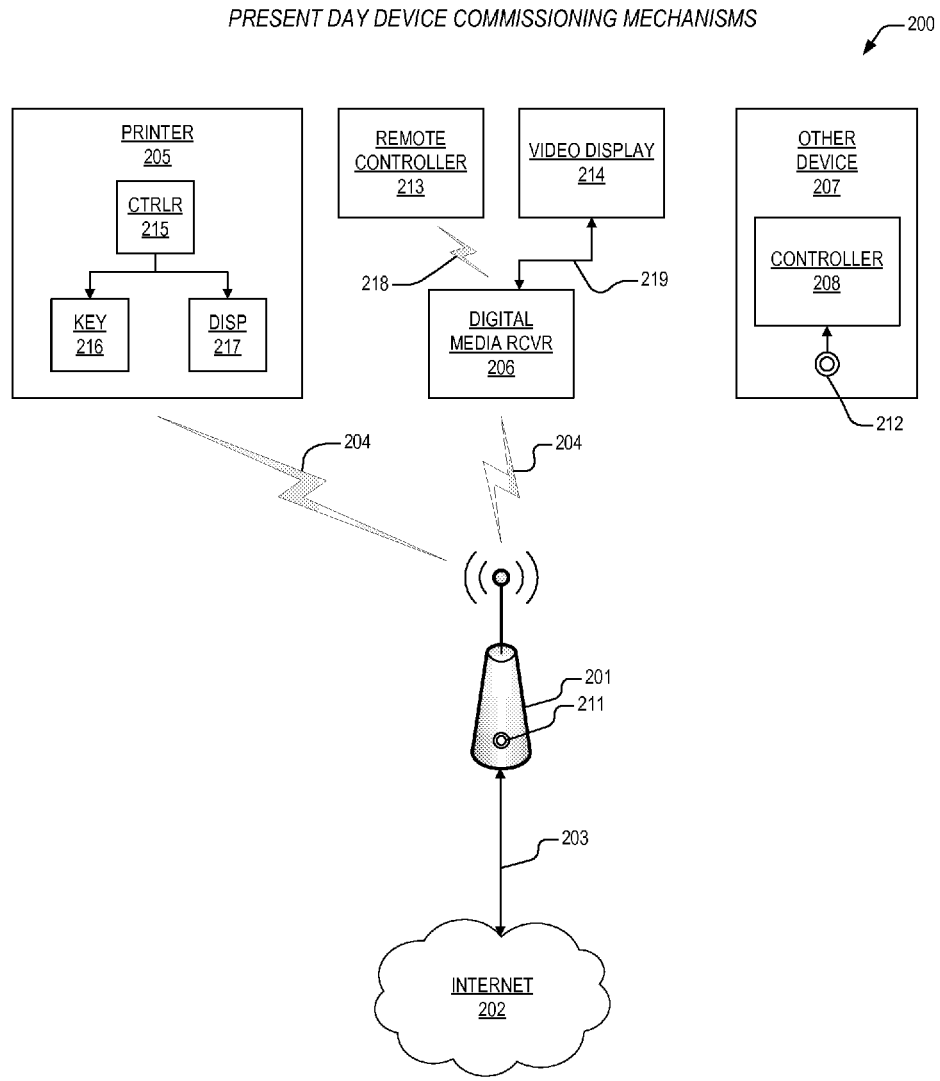
FIG. 2 is a block diagram depicting present day commissioning mechanisms such as might be employed in the technique of FIG. 1.

FIG. 2 is a block diagram 200 depicting present day commissioning mechanisms such as might be employed in the technique of FIG. 1. The diagram 200 depicts a WLAN access point 201 that is coupled to the Internet 202 via a bus 203, and which controls access to a wireless LAN 204. Operationally, the access point 201 functions substantially like the access point 101 of FIG. 1. A printer 205 is coupled to the access point 201 via the WLAN 204. The printer 205 has a controller 215 that is coupled to a keyboard 216 and display 217. The diagram 200 also shows a digital media receiver 206 that is coupled to the access point 201 via the WLAN 204. The receiver 206 is also coupled to a remote controller 213 via a radio wave bus 218, and to a video display 214 (e.g., a television) via bus 219. The diagram 200 additionally depicts an other device 207 that requires commissioning onto the WLAN 204. The other device 207 includes a controller 208 that is coupled to a pushbutton switch 212.

The particular elements shown in FIG. 2 are well known to those in the art and are selected to illustrate limitations associated with some of the most prevalently employed present day commissioning techniques. For example, one well known commissioning technique utilizes coordinated activation of pushbutton switches to initiate the exchange of configuration data so that, say, the other device 207 can join the WLAN 204. Accordingly, a commissioning pushbutton switch 211 is shown on the access point 201, which functions in this scenario as a system controller for the other device 207. Thus, a technician is required to perform a time synchronized actuation of the pushbutton switches 211, 212 on both the access point and the other device 207 and by doing so, the access point 201 begins transmission of packets that include configuration data, thus enabling the other device 207 to subsequently join the WLAN 204. Transmission of this configuration data is typically accomplished utilizing the same radio transceivers (not shown) as are required for interoperability over the WLAN 204 itself. But the present inventors have observed that this "pushbutton" commissioning technique is disadvantageous because physical and/or administrative access to the access point 201 is required in order to accomplish commissioning of the other device 207, and in office and other scenarios where security concerns are paramount, such access may not be easily obtained.

Another well known present day commissioning technique provides for the direct entry of device configuration data utilizing integral or directly coupled controls and displays. For instance, consider a scenario under which an operator may commission the printer 205 onto the WLAN 204 by performing a series of data entry steps via the keypad 216 and display 217. The operator may select from a menu of WLAN types and then the printer 205 will monitor for available networks of that type, thus allowing the operator to select from a menu of available networks. The operator may then be required to enter secure access information (e.g., passwords, etc.) to enable the printer to join the WLAN.

Or consider a more intelligent commissioning technique where, say, the digital media receiver 206 possesses the capabilities to determine the appropriate WLAN 204 to join, and all that is needed is for the operator to enter a personal identification number (PIN) via the remote controller 213 and verify configuration setup via the video display 214.

The above commissioning techniques may be categorized in general as Wi-Fi protected setup techniques, and are well known to those in the art. Other techniques also include the use of near-field communications and the use of a direct connection such as Universal Serial Bus (USB). In more extreme cases, a device to be commissioned (e.g., the other device 207), may create a temporary network and require the operator to configure a computing device (not shown) to join the temporary network. Then, the computing device is subsequently used to issue commands and configuration data to the devices, thus allowing it to join the intended WLAN 204.

Alternatively, the device to be commissioned may be required to monitor for specially formatted probes or beacon request messages in order to decode network configuration data therefrom. Such a scenario could be employed utilizing the pushbutton method discussed above.

The present inventors note that, as one skilled in the art will appreciate, virtually all of the above noted commissioning techniques require physical and/or administrative access to either the access point 201 or to special commissioning equipment which, as is alluded to above, may not be easily obtained. It is also noted that commissioning techniques that involve the use of PINS and/or the direct entry of configuration data present the opportunity for tampering and or breech of security through the compromise of trusted data. It is furthermore noted that the creation of near-field communications and ad hoc networks requires dedicated equipment for such purposes. And moreover, all of the techniques discussed above present challenges to those other than a skilled technician. A typical operator may not be skilled in the entry of network configuration data or configuration of special commissioning equipment. In addition, for those techniques that temporarily open a network in order to commission as device, such an action is both observable and sniffable, thus providing a pathway for exploitation of the compromised parameter that allow unauthorized users and devices to join the network at a later time. Consequently, the wide range of complex commissioning techniques are challenging those in the art to develop more user-friendly, secure, and effective mechanisms for device commissioning than have heretofore been provided. More specifically, with the exponential increase in the deployment of wireless devices in the marketplace, those in the art are motivated to provide commissioning techniques that a typical user can perform without problems.

The present invention overcomes the above noted limitations, and others, by providing an apparatus and method for seamless device commissioning which, in one embodiment, leverages the ubiquitous nature and use of so-called "smart" wireless devices in the home and office. The present invention will now be discussed with reference to FIGS. 3-8.

Figure 3:
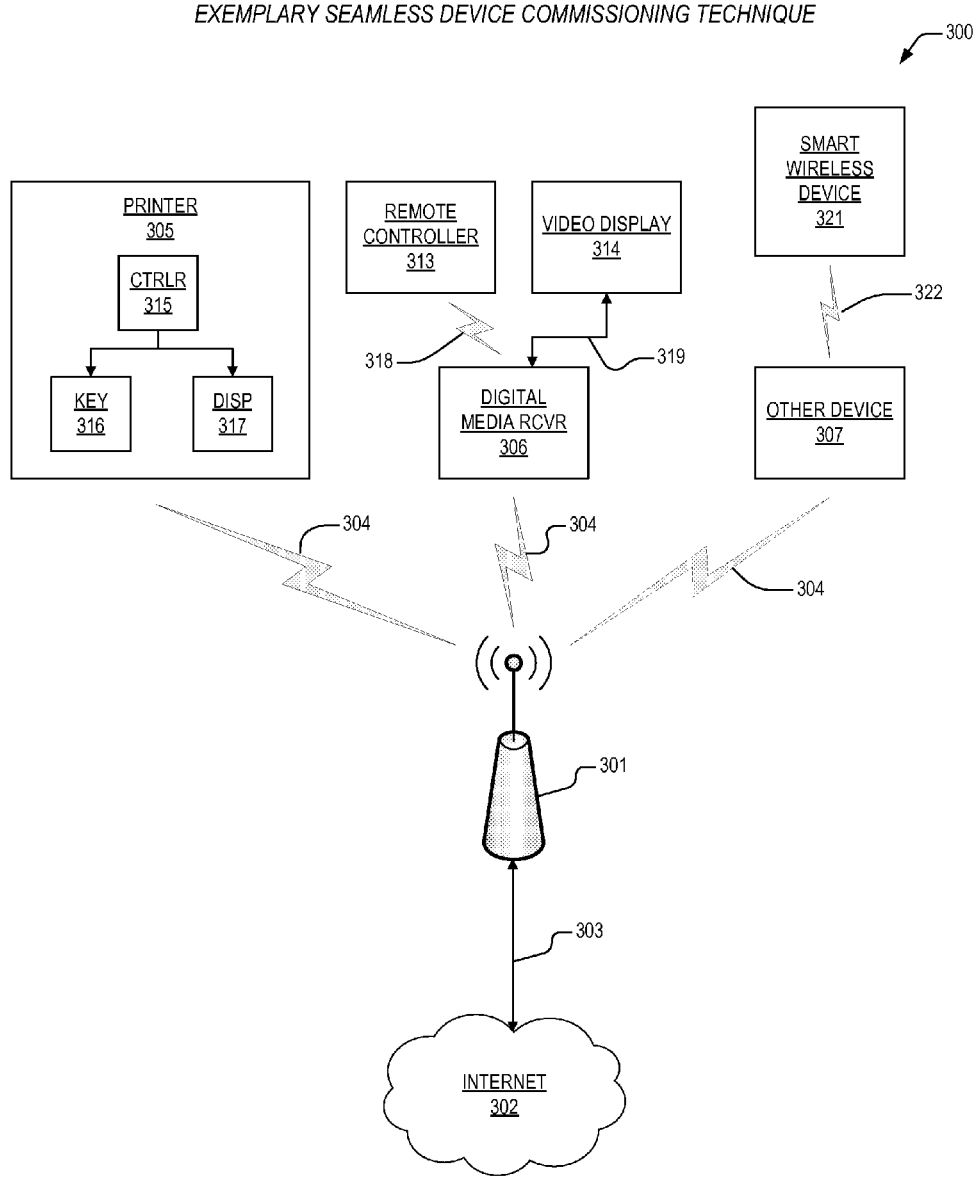
FIG. 3 is a block diagram featuring an exemplary seamless device commissioning technique according to the present invention.

Turning to FIG. 3, a block diagram 300 is presented featuring an exemplary seamless device commissioning technique according to the present invention. The diagram 300 depicts a wireless local area network (WLAN) access point 301 that controls access to and communications over a WLAN 304. Like the access point 101 of FIG. 1, the access point 301 according to the present invention allows electronic devices 305-307 to exchange data wirelessly over the wireless network 304 once the devices 305-307 are commissioned onto the WLAN 304. In one embodiment, the network 304 utilizes protocols based on the Institute of Electrical and Electronics Engineers' (IEEE) 802.11 standards, however, such references are not intended to limit protocols of the network 304 to 802.11, but rather reference is made to the well known 802.11 standards in order to teach aspects of the present invention.

The WLAN access point 301 is coupled via bus 303 to the Internet in any of number of well known ways to include digital subscriber line (DSL), cable, and wireless radio link. As such, the access point 301 enables the devices 305-307 to communicate with each other, and also to other devices (not shown) over the Internet 302.

The diagram 300 shows a printer 305 and a digital media receiver 306 (e.g., APPLETV®, ROKU®, DIRECTV®) that are coupled to the access point 301 via the WLAN 304. The diagram additionally shows an other device 307 that is not yet coupled to the access point 301 via the WLAN 304, and which requires commissioning into the WLAN 104. As one skilled in the art will appreciate, the other device 307 may comprise, but is not limited to a personal computer, a video game console, a smartphone, a tablet computer, an alarm console, a streaming media player, network attached storage, and any number of other Wi-Fi enabled appliances (e.g., outlets, lights, locks, sensors, etc.).

Like the printer 205 of FIG. 2, the printer 305 of FIG. 3 includes a controller 315 that is coupled to a keyboard 316 and a display 317, which are employed according to one of the present day methods described above to commission the printer 305 onto the WLAN 304. And like the receiver 206 of FIG. 2, the receiver 306 of FIG. 3 is coupled to a remote controller 313 via bus 318 and a video display 314 via bus 319, which are employed according to one of the present day methods described above to commission the receiver 306 onto the WLAN 304.

However, in contrast to present day commissioning techniques, the technique according to the present invention utilizes a smart wireless device 321 to commission the other device 307 according to the present invention onto the WLAN 304 by utilizing existing mechanisms (i.e., transmitting elements (not shown)) on the smart wireless device 321 to transmit configuration information over a transmission path 322 to the other device 307, thus enabling the other device 307 to join the WLAN. The other device 307 is configured to include receiving elements (not shown) that correspond to the transmitting elements and transmission path 322, thus enabling the other device 307 to receive and process the configuration information. It is a feature of the present invention to employ a smart wireless device 321 and to utilize existing elements within the smart wireless device 321 to transmit the configuration information to the other device such as an internal microcomputer, memory, a camera flash, backlit display, touchscreen or keyboard, and the like. Advantageously then, commissioning can be affected without a requirement for special commissioning equipment or special user skills.

In one embodiment, the smart wireless device 321 comprises a smart cellular telephone such as, but not limited to, an IPHONE® or ANDROID® phone. In another embodiment, the smart wireless device 321 comprises a tablet computer such as, but not limited to, an IPAD® or an ANDROID® tablet. Other embodiments of the smart wireless device 321 are contemplated which are capable of providing the functions and mechanisms discussed below.

In one embodiment, the smart wireless device 321 utilizes a side band, proximity based, communication channel 322 that is established between a the smart wireless device 321 and the other device 307 to be commissioned onto the WLAN 304. The transmitting and receiving elements perform the functions and operations as discussed above. The transmitting and receiving elements comprise logic, circuits, devices, or program instructions executed by a microprocessor or other processing unit, or a combination of logic, circuits, devices, or program instructions executing on a microprocessor of other processing unit, or equivalent elements that are employed to execute the functions and operations according to the present invention as disclosed herein. The elements employed to accomplish these operations and functions within the transmitting and receiving elements may be shared with other circuits, program instructions, etc., that are employed to perform other functions and/or operations within the transmitting and receiving elements. In one embodiment, the smart device 321 constructs a commissioning message that includes WLAN configuration data. The message is transmitted by the smart device 321 to the other device 307 via the transmitting elements and the message is received by the other device 307 via the receiving elements. In one embodiment, the WLAN configuration data comprises the name of the WLAN, security mode, and any required security passphrase. Other embodiments contemplate additional or different configuration data as is appropriate for commissioning the other device 307.

In operation, the other device 307 extracts the WLAN configuration data from the received configuration message and employs the configuration data in order to join the WLAN 304.

In one embodiment, the transmitting elements comprise an existing camera flash and the receiving elements comprise an optical sensor. Another embodiment contemplates utilization of a display backlight that transmits optical signals to an optical sensor. A further embodiment comprehends the use of infrared transmission and receiving elements. Still another embodiment utilizes an acoustic speaker and microphone to transfer the configuration data via sound. Yet another embodiment utilizes BLUETOOTH® or substantially similar radio transmissions to transfer the configuration data. Further embodiments utilize near field communications (NFC) or mechanical vibration/accelerometer transmission.

Alternative embodiments of the transmitting elements may use disparate radio frequencies such as, but not limited to, 433 Megahertz (MHz), 868 MHz, 900 MHz, 2.4 Gigahertz (GHz), or 5.2 GHz. These embodiments may use radio modulation techniques such as, but not limited to, frequency shift keying (FSK), phase shift keying (PSK), on-off keying (OOK), and quadrature amplitude modulation (QAM). These embodiments may use radio frequency (RF) communication standards such as, but not limited to, near field communication (NFC), RF identification (ID), BLUETOOTH LOW ENERGY®, Zigbee®, radio frequency for consumer electronics (RF4CE®), Z-Wave®, or other proprietary standards.

Figure 4:
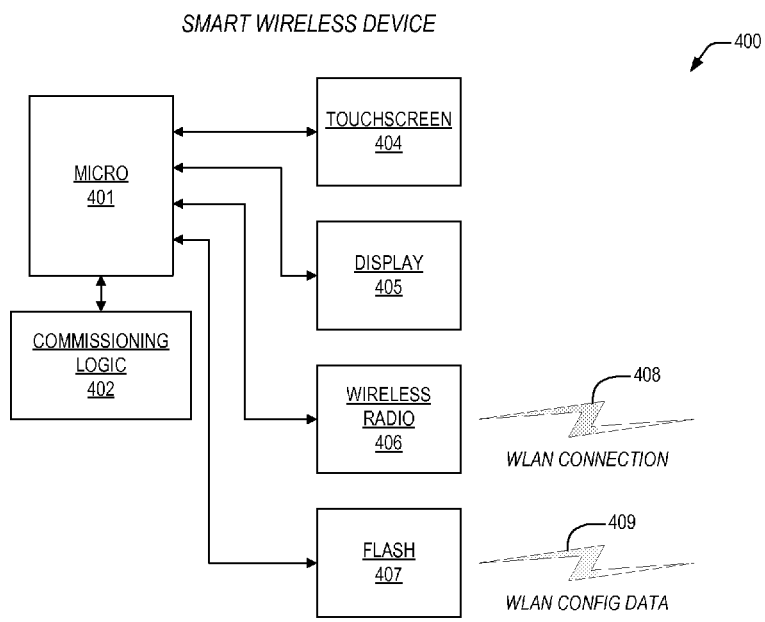
FIG. 4 is a block diagram showing a smart wireless commissioning device according to the present invention.

Referring now to FIG. 4, a block diagram is presented showing a smart wireless commissioning device 400 according to the present invention. The smart device 400 is configured to format and transmit WLAN configuration data to a corresponding device to be commissioned according to the present invention by utilizing an optical transmission path. The smart device 400 comprises a microcomputer 401 (e.g., microprocessor, central processing unit, processor, microcontroller, and etc.) that is coupled to commissioning logic 402. The microcomputer is also coupled to an existing touchscreen 404, a display 405, a wireless radio 406, and a camera flash 407. In one embodiment, the camera flash 407 is employed as a transmitter to convey configuration data to the device to be commissioned.

Operationally, the microcontroller 401 includes processing circuits that are employed to format and configure WLAN configuration packets which are optically transmitted by the camera flash 407 by modulating the flash 407 on and off to transmit the packets according to any well known communication protocol or via a proprietary protocol. The commissioning logic 402 includes program instructions that direct the microcontroller 401 to format and transmit the WLAN configuration packets to the device to be commissioned. In one embodiment, the commissioning logic 402 comprises an existing memory element (e.g., random access memory (RAM), read-only memory (ROM), electrically programmable ROM (EPROM), flash memory) within the device 400. In this embodiment, the commissioning logic 402 may be external to the microcontroller 401 or internal to the microcontroller 401. An alternative embodiment comprehends stand-alone commissioning logic 402 (e.g., circuits and/or program instructions) that operates to transmit the commissioning packets independent from operation of other device functions provided for by the microcontroller 401.

The touchscreen 404 and display 405 are employed to initiate execution of the program instructions by the microcontroller via, in one embodiment, launching a commissioning application on the smart wireless device 400. Additionally, the display 405 may be employed to provide status and/or commissioned device information. The WLAN configuration data is optically transmitted by the flash 407 over an optical transmission patch 409 to the device to be commissioned. The wireless radio 406 may be employed via a WLAN 408 to communicate with a WLAN access point (not shown) or to the commissioned device following commissioning.

In lieu of using the camera flash 407, an alternative embodiment of the smartphone commissioning device 400 employs a backlight function of the display 405 as the transmitter portion of the transmitting element, where the backlight is modulated on and off as described above. Other embodiments for optically transmitting the commissioning message are contemplated such as intensity modulation (e.g., brightness) and/or modulation of the color of the backlight.

Operationally, the remaining elements of the smart wireless device 400 work according to control provided by the commissioning logic 402 (or the commissioning logic 401 in conjunction with the microcontroller 401) to cause the camera flash 407 to transmit the commissioning packets to the device to be commissioned, thereby allowing it to join the WLAN 408. In one embodiment, after the commissioned device has joined the WLAN 408, the wireless radio 406 is employed to optionally receive commissioning confirmation data from and/or to transmit supplemental configuration data to the commissioned device via the WLAN connection 408.

As is appropriate for the chosen transmitting element and receiving element, a variety of well known communication protocols, error correcting codes, line coding, and/or modulation techniques may be used to send the messages from the transmitter to the receiver in a reliable manner according to the present invention.

Figure 5:
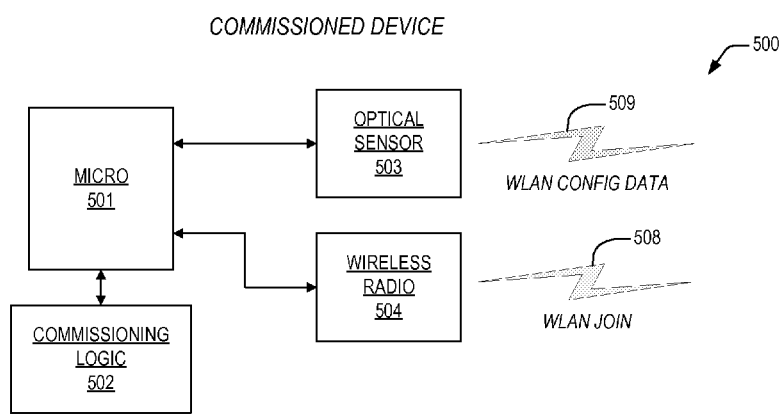
FIG. 5 is a block diagram illustrating a commissioned device according to the present invention.

Now turning to FIG. 5, a block diagram is presented illustrating a commissioned device 500 according to the present invention. The commissioned device 500 may be commissioned onto a WLAN by the smart wireless device 400 of FIG. 4. The commissioned device 500 comprises a microcontroller 501 that is coupled to commissioning logic 502. The microcontroller 501 is also coupled to an optical sensor 503 and to a wireless radio 504. In the embodiment shown, the optical sensor 503 is employed as a transducer to receive WLAN configuration data from a the wireless smart device 400 of FIG. 4 over an optical transmission link 509.

Operationally, the microcontroller 501 includes processing circuits that are employed to decode and process WLAN configuration packets which are optically received by the optical sensor 503 over the transmission link 509. The commissioning logic 502 includes program instructions that direct the microcontroller 501 to decode and process the WLAN configuration packets. In one embodiment, the commissioning logic 502 comprises an existing memory element within the device 500. In this embodiment, the commissioning logic 502 may be external to the microcontroller 501 or internal to the microcontroller 501. An alternative embodiment comprehends stand-alone commissioning logic 502 (e.g., circuits and/or program instructions) that operates to receive the commissioning packets independent from operation of other device functions provided for by the microcontroller 501.

In one embodiment, after the commissioned device has joined the WLAN 508, the wireless radio 506 is employed to optionally transmit commissioning confirmation data to and/or to receive supplemental configuration data from the smart wireless device and to communicate with the access point and other devices on the WLAN connection 508 as required.

Figure 6:
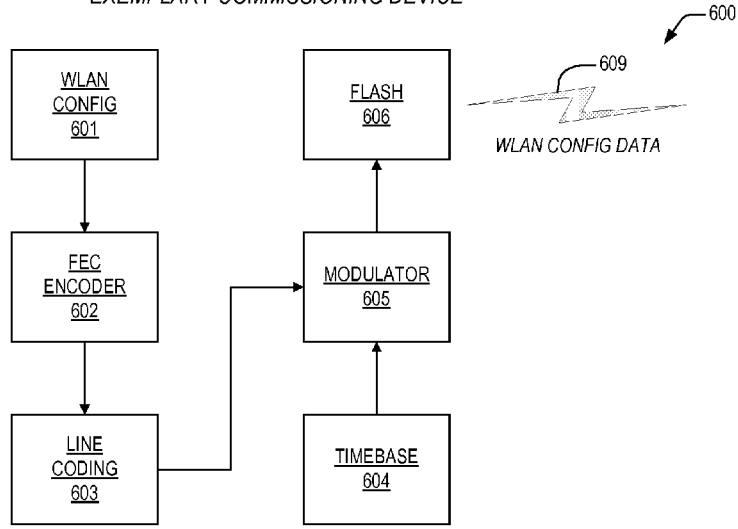
FIG. 6 is a block diagram detailing features of an exemplary commissioning device according to the present invention.

Referring to FIG. 6, a block diagram is presented detailing features of an exemplary commissioning device 600 according to the present invention, such as the smart wireless device 400 of FIG. 4. The device 600 includes WLAN configuration data 601 that is provided to a forward error correction (FEC) encoder 602. Encoded configuration data is generated by the encoder 602 and is provided to a line coding element 603. One embodiment contemplates a Manchester encoder 603. The line coding element 603 removes any direct current (DC) component from the configuration packets and allows transmission thereof to be self-clocking. Line coded configuration data is thus provided to a modulator 605. The modulator 605 is also coupled to a timebase 604. The modulator 605 combines the line coded data with timebase data to enables one or more corresponding optical messages to be serially transmitted. Modulated configuration data is thus provided by the modulator 605 to a flash 606, which transmits the WLAN configuration packets over an optical transmission patch 609. Elements 601-605 may be implemented by a combination of elements within the microcontroller 401 and commissioning logic 402 of FIG. 4.

Figure 7:
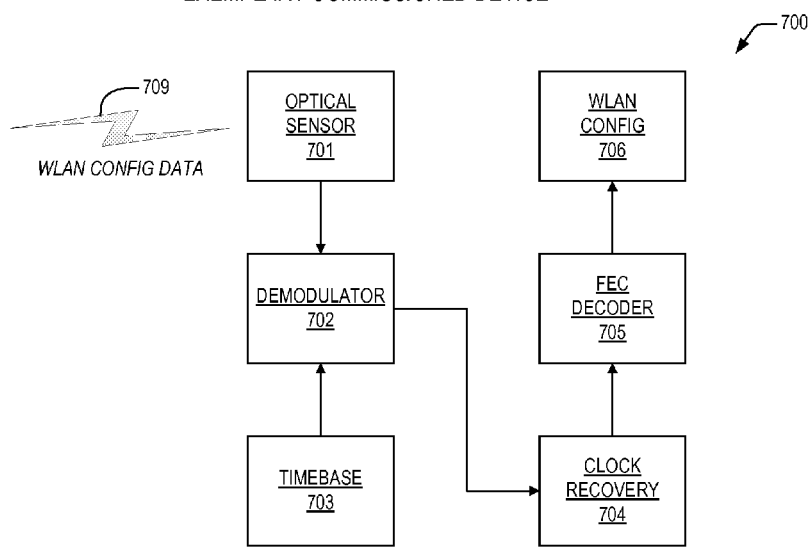
FIG. 7 is a block diagram showing details of an exemplary commissioned device according to the present invention.

Now referring to FIG. 7, a block diagram is presented showing details of an exemplary commissioned device 700 according to the present invention, such as the commissioned device 500 of FIG. 5. The commissioned device 700 includes an optical sensor 701 that is employed as a transducer to receive WLAN configuration data packets which are transmitted over an optical channel 709 by a commissioning device according to the present invention. The received bit stream is provided by the sensor 701 to a demodulator 702 that is also coupled to a timebase 703. The demodulator 702 may employ accurate timebase data to sample the transmission at a higher rate than the original timebase 604 used by the modulator 605 of FIG. 6. The output of the demodulator 702 is then sent to clock recovery 704. The clock recovery utilizes the line coding added by the transmitter to discover the original timebase used by the modulator 605. The clock recovery 704 then discards any extra samples and removes the line coding. The output of clock recovery 704 is then sent to an FEC decoder 705 which corrects any errors found in the transmission and recovers one or more commissioning messages. The commissioning messages provide the WLAN configuration data 706, which is used by the product to join the WLAN. Elements 702-706 may be implemented by a combination of elements within the microcontroller 501 and commissioning logic 502 of FIG. 5.

Figure 8:
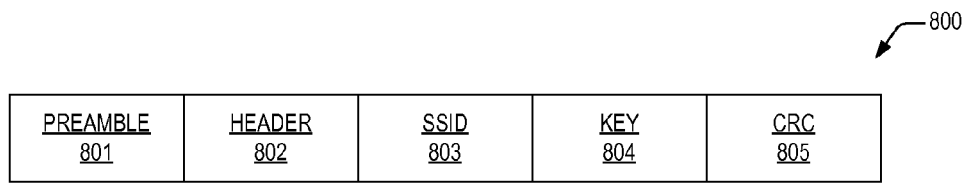
FIG. 8 is a block diagram illustrating an exemplary commissioning packet according to the present invention.

Referring now to FIG. 8, a block diagram is presented illustrating an exemplary commissioning packet 800 according to the present invention. The packet 800 includes a preamble field 801, a header field 802, a service set identifier (SSID) field 803, a key field 804, and a cyclic redundancy check (CRC) field 805. Operationally, the preamble 801 may be a 16-bit stream of repeating zeros and ones that allow a receiver according to the present invention to asynchronously synchronize with a transmitter according to the present invention. The header 802 may comprise two bytes, the first of which may be employed as a start frame delimiter and the second of which identifies a message type. The SSID 803 identifies the wireless network service set, and the key field 804 may comprise the network key. The CRC 805 is the result of a 16-bit CRC over the SSID 803 and key 804 fields using the polynomial $X^{16}+X^{2}+X^{5}+1$.

Although the present invention and its objects, features, and advantages have been described in detail, other embodiments are encompassed by the invention as well. For example some embodiments may require that the device to be commissioned be placed into a commissioning mode to receive the commissioning messages. Other embodiments may accept the commissioning messages concurrent with other operations of the commissioned device.

Some embodiments may transmit the WLAN configuration data in a single commissioning message, while other embodiments employ multiple commissioning messages to communicate the configuration data.

Some embodiments of the present invention may transmit other information in addition to WLAN configuration data. In one such embodiment, the commissioning device sends its own Internet protocol (IP) address, proxy, and gateway configuration to the device to be commissioned. Once the device to be commissioned has successfully joined the WLAN, then the device proceeds to contact the commissioning device via the WLAN to indicate success and to optionally communicate additional configuration data as is described above.

In some embodiments, the commissioned device provides a visual or audio indication to the user about the status of the commissioning process. In one embodiment, the commissioned device may illuminate an indicator (e.g., light emitting diode (LED)) to indicate progress, success, or failure of the commissioning. In another embodiment, the commissioned device may use a speaker to provide an audio indication of the commissioning status.

One embodiment of the present invention includes a configuration mode where the commissioned device communicates back to the smart wireless device via optical or audio transmission. The smart wireless device may observe this communication with existing hardware, such as a built-in camera for reception of the optical transmission, or a microphone for reception of the audio transmission. This type of communication may be used to alert the smart wireless device (and operator) of success or failure conditions.

In other embodiments, the commissioning device may be informed of the WLAN configuration data in a variety of ways. In one embodiment, it may derive the WLAN configuration data from its own active connection to the WLAN. In another embodiment, WLAN configuration data may be entered by the user directly into the commissioning device via the touchscreen and/or keyboard. Another embodiment contemplates automatic derivation of the WLAN configuration data by contact with a server or via some other record of the configuration data. Combinations of the above noted embodiments are also comprehended for determination of the configuration data by the commissioning device.

Further embodiments contemplate usage of desktop and laptop computers as commissioning devices, where their display screens, backlights, speakers, microphones, and the like are employed for visual communication of commissioning messages.

Advantageously, a commissioned device according to the present does not require its own user interface, but rather the commissioning device's existing display and/or touchscreen may be utilized to input commissioning data and to output commissioning results.

In addition, from an operator perspective, configuration data is sent from the commissioning device to the product device in a single step rather than a complex series of single data entry actions.

Furthermore, since a smart wireless device is employed as a commissioning device, it already possesses the ability to automatically discover WLAN configuration, thus simplifying user experience.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims.

What is claimed is:

1. A non-transitory computer readable storage medium storing one or more programs configured for execution by an electronic device for commissioning a target device onto a wireless local area network (WLAN), the electronic device including a first processor, a first wireless radio configured to communicate over the WLAN, a first commissioning element configured to communicate WLAN configuration data, and a first memory configured to store the one or more programs for execution by the first processor, the one or more programs being configured to, when executed by the electronic device, cause the electronic device to perform operations comprising:

providing a user interface for commissioning the target device, wherein the target device includes a second processor, a second wireless radio, and a second commissioning element configured to receive the WLAN configuration data, the second processor being configured to decode and process the WLAN configuration data for commissioning the target device onto the WLAN;

formatting and communicating to the target device, via the first commissioning element, the WLAN configuration data associated with the WLAN according to a predetermined format, the WLAN configuration data including an identifier of the WLAN and a network key for the WLAN that enables connection to the WLAN by the target device; and receiving information indicating that the target device has successfully connected to the WLAN.

2. The non-transitory computer readable storage medium of claim 1, wherein the first commissioning element is a display of the electronic device.

3. The non-transitory computer readable storage medium of claim 2, wherein the communicating comprises modulating visible output light intensity of the display to communicate the WLAN configuration data.

4. The non-transitory computer readable storage medium of claim 3, wherein the modulating further comprises modulating the visible output of the display using optical signals generated by a display backlight of the electronic device.

5. The non-transitory computer readable storage medium of claim 1, wherein the communicating comprises modulating optical signals generated by a camera flash of the electronic device to communicate the WLAN configuration data.

6. The non-transitory computer readable storage medium of claim 1, wherein the first commissioning element is a wireless radio.

7. The non-transitory computer readable storage medium of claim 6, wherein the wireless radio employs one or more radio technologies and/or communication protocols selected from the group consisting of Bluetooth, WiFi, IEEE 802.15.4, radio frequency identification (RFID), radio frequency for consumer electronics (RF4CE), near field communication (NFC), ZigBee radio, and Z-Wave radio.

8. An electronic device, comprising:
a first processor;
a first commissioning element configured to communicate information to external devices using one or more wireless communication technologies;
a first memory storing programs for execution by the first processor, the programs including an application for commissioning a target device onto a wireless local area network (WLAN), the WLAN having WLAN configuration data including an identifier of the WLAN and a network key for the WLAN, the application including instructions for performing at the electronic device operations comprising:

providing a user interface for commissioning the target device, wherein the target device includes a second processor and a second wireless radio, and the target device is configured under control of the second processor to receive, decode and process the WLAN configuration data for commissioning the target device onto the WLAN;

formatting and wirelessly communicating to the target device, and via the first commissioning element, the WLAN configuration data; and receiving information indicating that the target device has successfully connected to the WLAN; and indicating via the user interface that the target device has successfully connected to the WLAN.

9. The electronic device of claim 8, wherein the first commissioning element is a display of the electronic device and the communicating comprises modulating visible output light intensity of the display to communicate the WLAN configuration data.

10. The electronic device of claim 8, wherein one or more WLAN configuration packets data are communicated optically from the electronic device to the target device.

11. The electronic device of claim 8, wherein one or more WLAN configuration packets are modulated within optical signals generated by a backlight display of the electronic device.

12. The electronic device of claim 8, wherein one or more WLAN configuration packets are communicated via a wireless radio independently of the WLAN.

13. The electronic device of claim 12, wherein the wireless radio is based on one of Bluetooth, radio frequency identification (RFID), ZigBee, radio frequency for consumer electronics (RF4CE), Z-Wave, mesh networking technologies, and near field communication technologies.

14. The electronic device of claim 12, wherein the wireless radio is associated with a standardized RF communication standard.

15. A method for commissioning a target device onto a wireless local area network (WLAN), comprising:
at an electronic device including a first processor and a first memory storing one or more programs for execution by the first processor:

displaying a user interface for commissioning the target device, wherein the target device is disposed in proximity to the electronic device and includes a second processor and a second memory storing programs for execution by the second processor, the programs stored in the second memory including program instructions that direct the second processor to decode and process WLAN configuration packets for commissioning the target device onto the WLAN and to decode and process electronic device information that identifies the electronic device for facilitating communication between the electronic device and the target device;

formatting and communicating, to the target device, one or more WLAN configuration packets that convey WLAN configuration data associated with the WLAN according to a predetermined format, wherein the WLAN is accessible to the electronic device;

receiving information indicating that the target device has successfully entered the WLAN; and communicating device configuration data to the target device, the device configuration data including electronic device information that identifies the electronic device for facilitating communication between the electronic device and the target device.

16. The method of claim 15, further comprising:

receiving from the target device an audio indication of a commissioning status for commissioning the target device into the WLAN, wherein the audio indication is broadcast from a speaker of the target device.

17. The method of claim 15, further comprising at the electronic device:

obtaining the WLAN configuration data from its own active connection to the WLAN;

receiving user inputs of the WLAN configuration data via a touchscreen or keyboard of the electronic device;

deriving the WLAN configuration data by contact with a server; and obtaining the WLAN configuration data in a configuration data record.

18. The method of claim 15, wherein the information indicating that the target device has successfully entered the WLAN.

19. The method of claim 15, wherein the target device does not include a user interface.

20. The method of claim 15, wherein the device configuration data include one or more of an IP address, a proxy, and gateway configuration of the electronic device.

* * * * *